United States Patent [19]

Terui et al.

[11] Patent Number: 4,881,094
[45] Date of Patent: Nov. 14, 1989

[54] LENS INTERCHANGE TYPE SINGLE-LENS REFLEX CAMERA SYSTEM AND INTERMEDIATE BARREL THEREFOR

[75] Inventors: Nobuhiko Terui, Ichikawa; Yosuke Kusaka, Yokohama; Yoshiharu Shiokama; Nobuaki Sasagaki, both of Kawasaki, all of Japan

[73] Assignee: Nikon Corporation, Tokyo, Japan

[21] Appl. No.: 154,585

[22] Filed: Feb. 10, 1988

[30] Foreign Application Priority Data

Feb. 16, 1987 [JP] Japan .................................. 62-32635

[51] Int. Cl.⁴ ............................................. G03B 17/14
[52] U.S. Cl. .................................................. 354/286
[58] Field of Search ......................................... 354/286

[56] References Cited

U.S. PATENT DOCUMENTS 4,548,488 10/1985 Honda et al. ....................... 354/402
4,572,638 2/1986 Nakai et al. ........................ 354/286
4,733,258 3/1988 Kojima ............................... 354/286

Primary Examiner—Michael L. Gellner
Attorney, Agent, or Firm—Shapiro and Shapiro

[57] ABSTRACT

A camera system includes a camera body, an interchangeable lens mountable on the camera body and outputting a discrimination signal, and an intermediate barrel mountable between the interchangeable lens and the camera body. The intermediate barrel has memory means storing therein a plurality of information data regarding the optical characteristic, selector means responsive to the discrimination signal to select one of the plurality of information data from among the plurality of information data, and output means for outputting an information signal conforming to the selected one of said plurality of information data to the camera body. The camera body effects a calculation process on the basis of the information signal.

12 Claims, 7 Drawing Sheets

F I G. 1
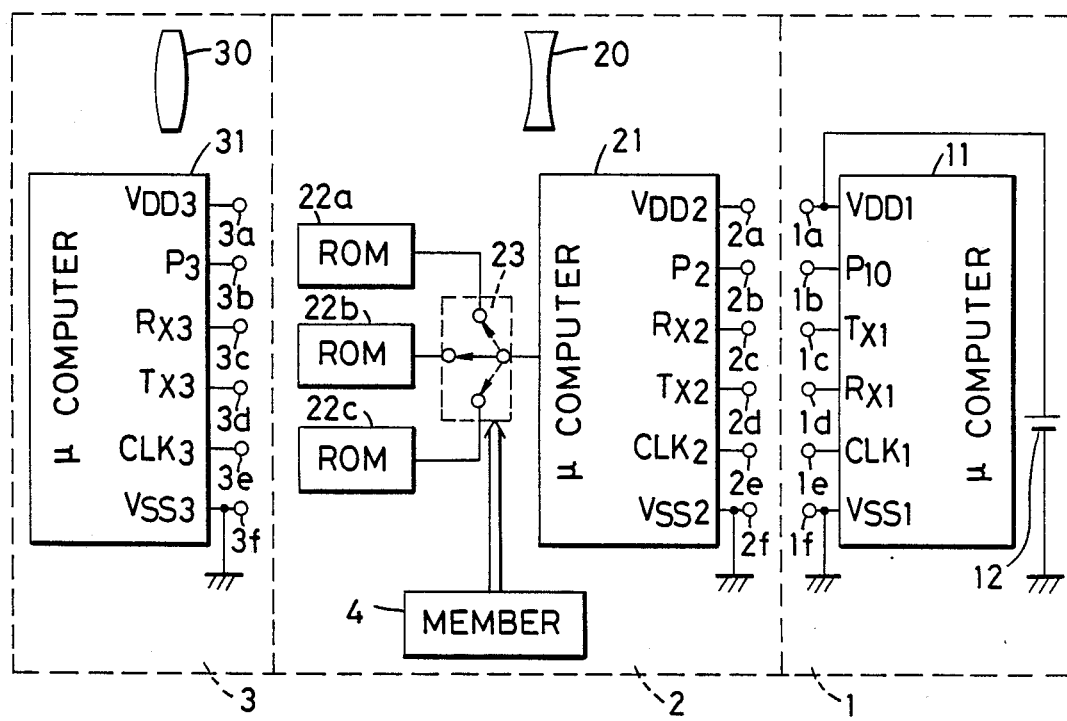
F I G. 2A
F I G. 2B
F I G. 2C
F I G. 2D
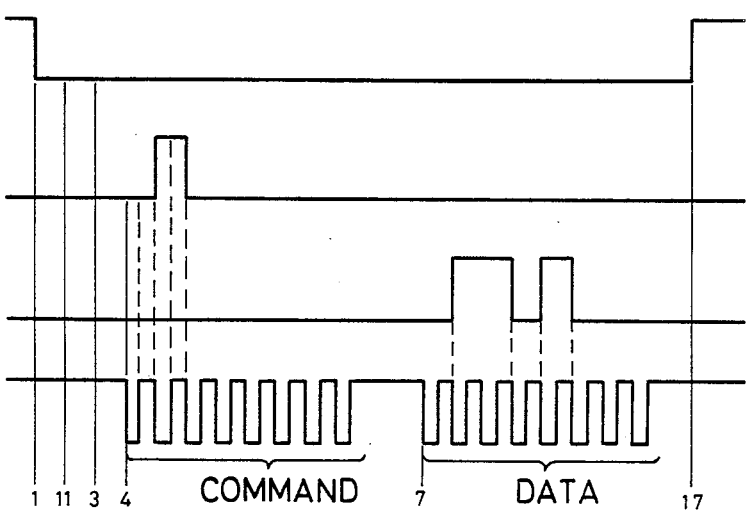

LENS INTERCHANGE TYPE SINGLE-LENS REFLEX CAMERA SYSTEM AND INTERMEDIATE BARREL THEREFOR

BACKGROUND OF THE INVENTION

1. Field of the Invention

This invention relates to a lens interchange type single-lens reflex camera system and an intermediate barrel mountable between a camera body and an interchangeable lens.

2. Related Background Art

When an intermediate barrel like a rear focus converter is mounted between an interchangeable lens and a camera body, the information of the interchangeable lens to be transmitted to the camera body, for example, the focal length and the open F-value become the combined value of the information of the interchangeable lens and the rear focus converter. As a system for transmitting the obtained combined value to the camera body, there is U.S. Pat. No. 4,548,488. This system is such that it receives the information from the interchangeable lens and calculates the information by the rear focus converter, thereby transmitting the obtained combined value to the camera body.

The lens information regarding the auto-focus, for example, the spherical aberration of a lens, is important information for determining the accurate position of the point of focus. As regards this spherical aberration, although the spherical aberration of each of the interchangeable lens and the rear focus converter is known, the combined spherical aberration of the two cannot be determined by a simple calculation. Thus, in the above-described prior art, the combined open F-value, the focal length, etc. can be transmitted to the camera body, but the information of the combined aberration, etc. cannot be accurately transmitted to the camera body.

SUMMARY OF THE INVENTION

It is an object of the present invention to accurately transmit a combined information value by a combination of an interchangeable lens and an intermediate barrel to a camera body by a simple construction without calculating the combined value by the intermediate barrel as in the prior art.

The present invention is characterized in that the intermediate barrel is provided with memory means storing therein a plurality of information data corresponding to a plurality of interchangeable lenses, selecting means for selecting one of said plurality of information data, and means for serially transmitting the selected one of said plurality of information data to a camera body.

In the present invention, the information of the combined value of the interchangeable lens and the intermediate barrel is stored in the intermediate barrel and the stored information is adapted to be transmitted to the camera body, and with regard to the various kinds of information for the focal length, the open F-value and the AF control and the aberration information, they are not calculated by the intermediate barrel to output a combined value and thus, accurate information can be transmitted to the camera body.

BRIEF DESCRIPTION OF THE DRAWINGS

FIG. 1 is a circuit diagram of a first embodiment of the present invention.

FIGS. 2A–2D are timing charts of serial data transfer.

DESCRIPTION OF THE PREFERRED EMBODIMENTS

Figure 3A:
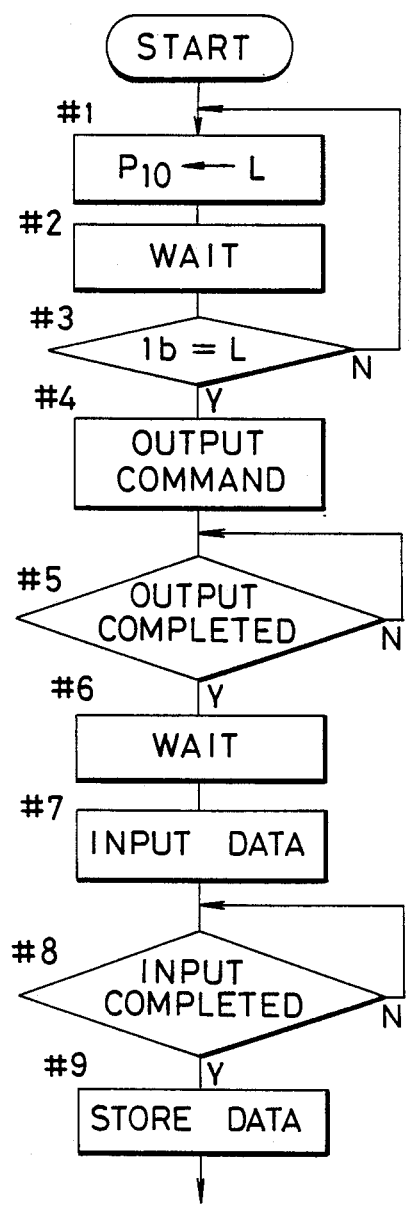
FIGS. 3A and 3B are flow charts of the first embodiment.
Figure 3B:
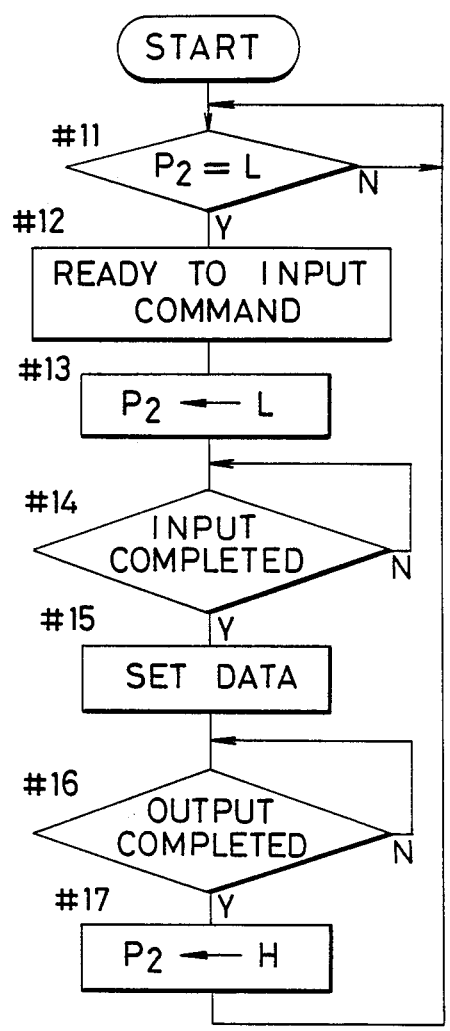

A first embodiment of the present invention is shown in FIG. 1. Usually an interchangeable lens 3 has an optical system 30 and, when it is mounted on a camera body 1, lens side contacts 3a–3f are connected to camera side contacts 1a–1f, respectively, and a camera side power source supplies power to a camera body circuit and also supplies power to a lens side circuit through the contacts 1a and 3a. The camera body then serially introduces lens information thereinto by the use of the contacts 1b–1e. When an intermediate barrel 2 is to be used, the intermediate barrel 2 is mounted between the interchangeable lens 3 and the camera body 1. The intermediate barrel 2 has an optical system 20 which cooperates with the optical system 30 of the interchangeable lens 3 to constitute a composite optical system. At this time, the contacts 3a–3f of the interchangeable lens 3 are connected to nothing, while the contacts 2a–2f of the intermediate barrel 2 are connected to the contacts 1a–1f, respectively, of the camera body. The reference numeral 11 on the camera side designates a conventional one-chip microcomputer (hereinafter referred to as MCU). The input/output port $P_{10}$ of MCU 11 is connected to the contact 1b, the serial data output terminal $T_{x1}$ of MCU 11 is connected to the contact 1c, the serial data input terminal $R_{x1}$ of MCU 11 is connected to the contact 1d, and the clock output terminal CLK 1 of MCU 11 is connected to the contact 1e. Change-over means 23 on the intermediate barrel side is operable from outside by a member 4. One of ROMs (read-only-memories) 22a, 22b and 22c in which a plurality of information data corresponding to a plurality of interchangeable lenses are stored is selected in conformity with an interchangeable lens by the operator operating the member 4, and the content of the selected ROM is transmitted to MCU 21. The input/output port $P_2$ of MCU 21 is connected to a contact 2b, the serial data input terminal $R_{x2}$ of MCU 21 is connected to a contact 2c, the serial data output terminal $T_{x2}$ of MCU 21 is connected to a contact 2d, and the clock input terminal CLK 2 of MCU 21 is connected to a contact 2e. The serial data communication method will now be described with reference to the flow charts of FIGS. 3A and 3B and the timing charts of FIGS. 2A–2D. FIG. 3A is a flow chart of the camera body side, and FIG. 3B is a flow chart of the intermediate barrel side. First, when the MCU 11 of the camera body 1 renders the port $P_{10}$ into "L" (#1), the port $P_2$ of the MCU 21 of the intermediate barrel 2 becomes "L" and therefore, the MCU 21 renders the command from the camera body capable of being input (#12) and renders the port $P_2$ into "L" (#13). After the lapse of a time during which the intermediate barrel 2 side seems to render the contact 1b into "L" (#2) after the MCU 11 has rendered the port $P_{10}$ into "L", the MCU 11 confirms that the contact 1b is "L" (#3). If at this time, the contact $1a$ is "H", it is judged that the intermediate barrel 2 side is not ready to wait for the command input, and the port $P_{10}$ is again rendered into "L". If the contact $1a$ is "L", the MCU 11 outputs a clock from the clock output terminal CLK 1 and also outputs a command from the serial data output terminal $T_{x1}$ (#4). On the other hand, when it is judged that the port $P_2$ is "L" (#11), the intermediate barrel 2 side brings about a state in which the command input from the camera body 1 side is possible (#12), and renders the port $P_2$ into "L" (#13). The command input and output method is carried out by the conventional clock synchronizing type serial data transfer. FIG. 2A shows the state between the contacts $1b$ and $2b$, FIG. 2B shows the state between the contacts $1c$ and $2c$, FIG. 2C shows the state between the contacts $1d$ and $2d$, and FIG. 2D shows the state between the contacts $1e$ and $2e$. As shown in the timing charts of FIGS. 2A–2D, the camera body 1 outputs data from the serial data output terminal $T_{x1}$ at the falling of the clock, and the intermediate barrel 2 side receives as an input the data from the serial data input terminal $R_{x2}$ at the rising of the clock, and the command input and output are completed when eight clock pulses are output.

In FIGS. 2A–2D, it is to be understood that the substance of the command is, for example, "02H" (H means a hexadecimal number). When the command input is completed (#14), the intermediate barrel 2 side takes out the data of the combined focal length from the ROM selected by the change-over means 23 (in FIG. 1, the ROM 22b) if it is decided that the command is the focal length when the value of the command is "02H", and sets it so that the serial data can be transferred to the camera body (#15). The camera body 1 side waits from the completion of the command output (#5) until the intermediate barrel 2 side completes the setting of the data (#6), whereafter it outputs a clock pulse (#7). At this time, the intermediate barrel 2 side outputs data from $T_{x2}$ at the falling of the clock pulse, and the camera body receives data as an input from $R_{x1}$ at the rising of the clock pulse. The data output is completed when eight clock pulses are output (#16). Thereupon, the port $P_2$ is rendered into "H" and the initial state is restored. After the completion of the input (#8), the camera body 1 side stores the data in a predetermined RAM (random access memory) (#9), and completes the data input from the intermediate barrel 2 side. Thereafter, the MCU 11 effects the calculation process concerned with exposure or auto-focus on the basis of the stored data.

In FIG. 1, from the above-described construction, the change-over means 23 is changed over with one of the ROMs 22a, 22b and 22c provided in the intermediate barrel 2 being made to correspond to the type of the interchangeable lens 3, whereby the accurate composite information value of the interchangeable lens 3 and the intermediate barrel 2 can be transmitted.

Figure 4:
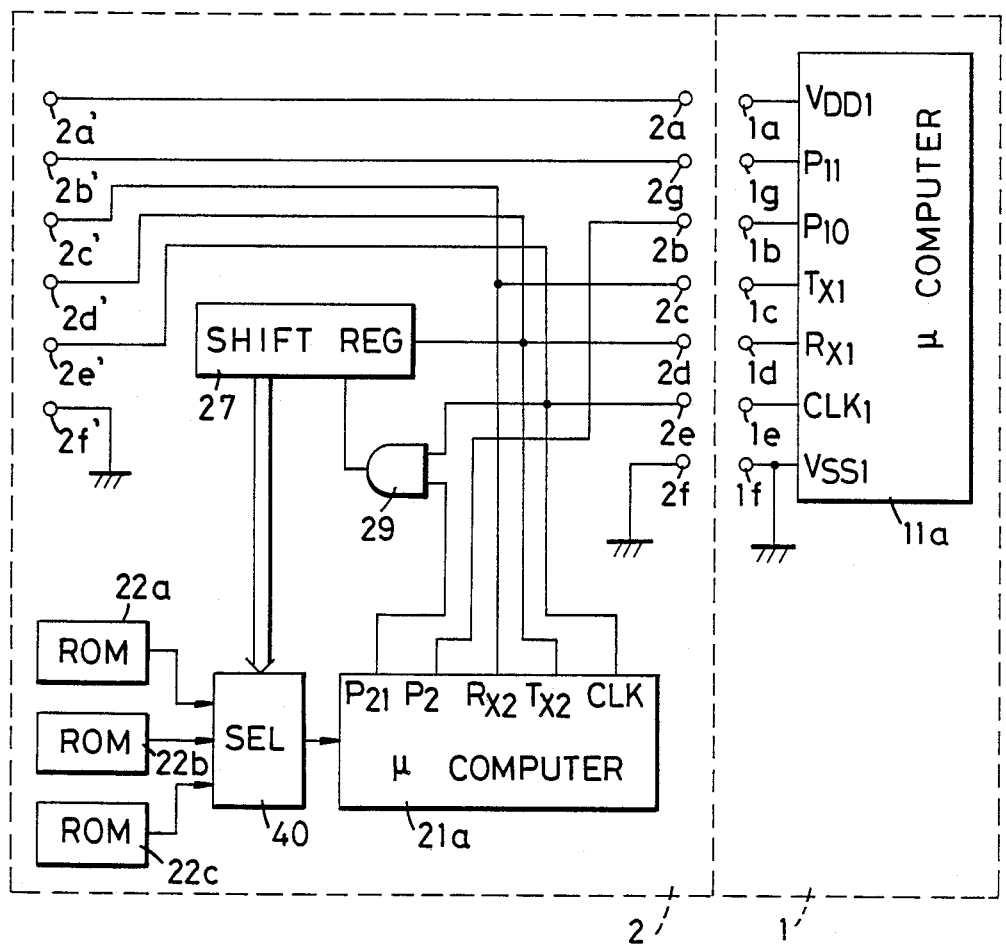
FIG. 4 is a circuit diagram of a second embodiment of the present invention.

A second embodiment of the present invention is shown in FIG. 4. The main differences of this embodiment from the embodiment of FIG. 1 are that an 8-bit shift register 27 is provided in the intermediate barrel 2, that a selector 40 which is changeover means is designed to select one of the ROMs 22a, 2b and 22c in accordance with the value of the shift register 27, and that the contacts $3a$–$3f$ of the interchangeable lens 3 are connected to the contacts $1a$–$1g$ (except $1b$) of the camera body 1 through the intermediate barrel 2. In FIG. 4, the interchangeable lens 3 is omitted, it being understood that the contacts $2a'$, $2g'$, $2c'$, $2d'$, $2e'$ and $2f$ of the intermediate barrel $2a$ are connected to the contacts $3a$–$3f$ of the MCU 31 of the interchangeable lens 3. The optical system 20 is also omitted.

Figure 5A:
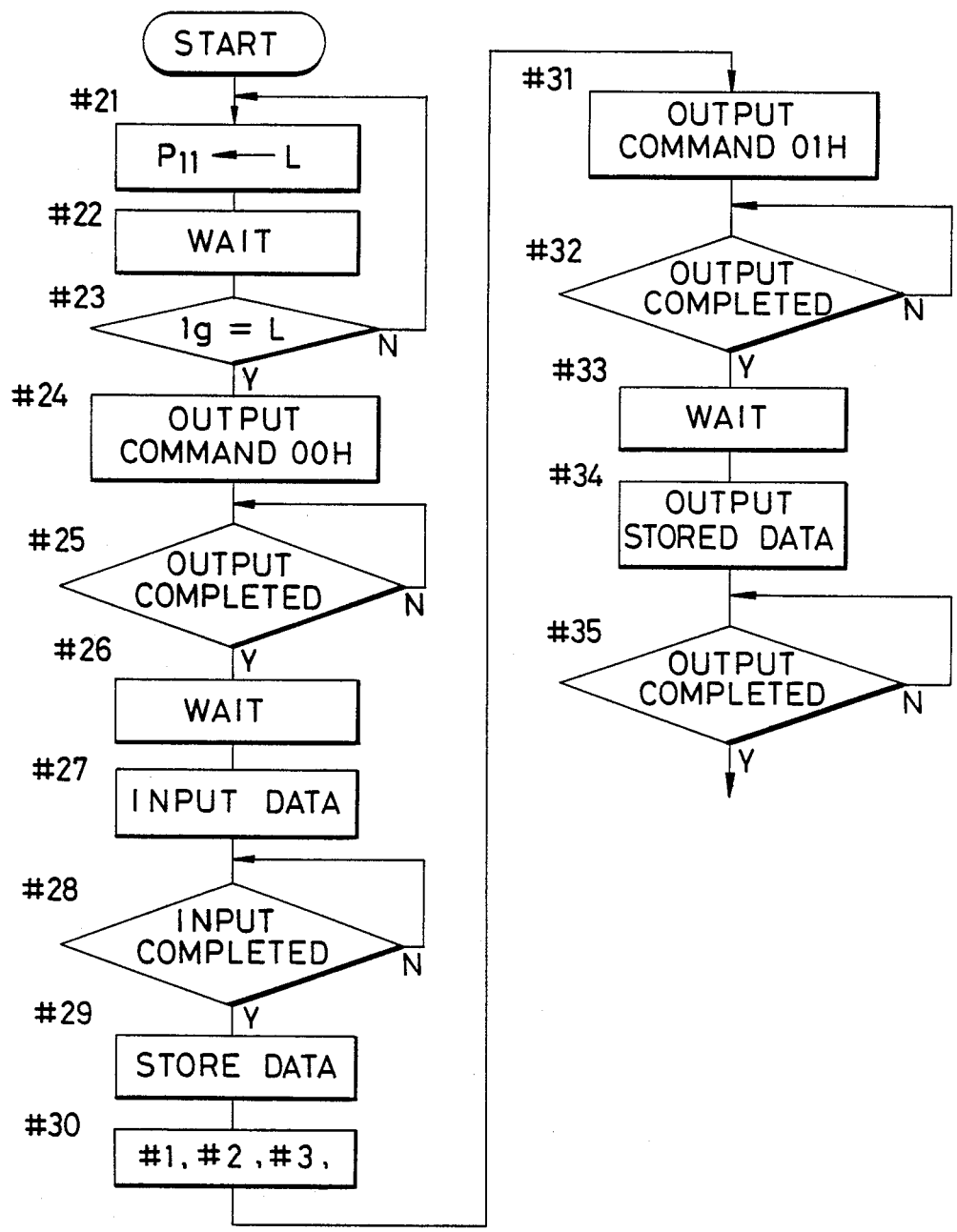
FIGS. 5A and 5B are flow charts of the second embodiment.
Figure 5B:
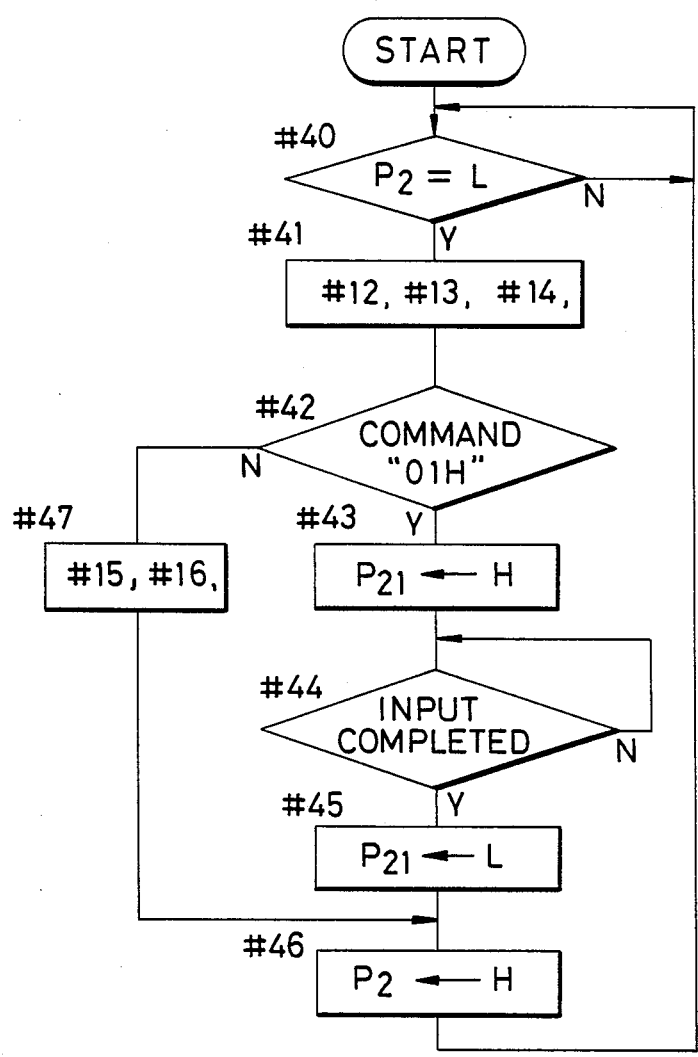

The operation of the second embodiment will hereinafter be described with reference to the flow charts of FIGS. 5A and 5B.

When the MCU $11a$ of the camera body 1 first renders a port $P_{11}$ into "L" (#21), the contact $3b$ of the interchangeable lens 3 becomes "L", and similarly to the steps #1, #12 and #13 of the aforedescribed intermediate barrel, the MCU 31 of the interchangeable lens 3 becomes ready to wait for a command input and renders the port $P_3$ into "L". When the MCU $11a$ confirms that the contact $1g$ is "L" (#23), $T_{x1}$ outputs a command (00H) to the contact $3c$ (#24). At this time, the command 00H causes the MCU 31 to output a lens discrimination signal. Accordingly, as at steps #13 and #14, upon receipt of the command, the MCU 31 of the interchangeable lens 3 is set in a state in which it is capable of outputting the lens discrimination signal. After the completion of the command output (#25), the MCU $11a$ waits until the MCU 31 of the interchangeable lens 3 becomes capable of outputting the lens discrimination signal, whereafter it outputs a clock pulse from CLK 1, whereby the lens discrimination signal is introduced (#27 and #28). This operation is similar to that in which in the time charts of FIGS. 2A–2D and the flow charts of FIGS. 3A and 3B, the intermediate barrel 2 is replaced with the interchangeable lens 3.

The MCU $11a$ stores the lens discrimination signal in a predetermined RAM (#29), whereafter it renders the port $P_{10}$ into "L" as at the step #1 of FIG. 3A. The MCU $21a$ of the intermediate barrel 2 receives it (#40), and becomes ready to wait for the command input at step #41 as at the steps #12 and #13 of FIG. 3B, and renders the port $P_2$ into "L". As at the step #3 of FIG. 3A, the MCU $11a$ confirms that the contact $1b$ is "L", and outputs a command (01H) (#31). When the command input is completed as at step #14, the MCU $21a$ judges whether the command is "01H" (#42), and if the command is not "01H", the MCU $21a$ takes out data from the ROM in accordance with the substance of the command at step #47, as at the steps #15 and #16 of FIG. 3B, and outputs the data, but if the command is "01H", the MCU $21a$ renders the port $P_{21}$ into "H" at step #43, and renders the clock pulse of the MCU $11a$ capable of being input to the clock input terminal of the shift register 27 through an AND gate 29. After the completion of the command output (#32), the MCU $11a$ outputs the aforementioned lens discrimination signal (#34). At this time, the clock pulse produced from the MCU $11a$ is output to the shift register 27 through the AND gate 29 and the lens discrimination signal output from the data output terminal $T_{x2}$ is output to the shift register 27 and therefore, simultaneously with the completion of the output, the content of the shift register 27 becomes the lens discrimination signal. Here, in accordance with the content of the shift register 27, the selector 40 selects one of ROMs 22a–22c. The selector 40 is comprised of a logic circuit, and has a plurality of gate circuits operable in response to the content of the shift register 27. For example, when the lens discrimination signal indicative of the data of ROM 22a is 001, the gate circuit connected to ROM 22a opens in response to the least significant digit 1, whereby the data of ROM 22a is input to the MCU $21a$. Thus, as in the embodiment of FIG. 1, the MCU $21a$ becomes capable of outputting the composite information value of the interchangeable lens 3 and the intermediate barrel 2 to the camera body 1. The excellence of the present embodiment over the embodiment of FIG. 1 is that in FIG. 1, the selecting method of the selector 40 which is the change-over means is accomplished manually or by giving up the change-over means 23 and replacing the ROM 22 by the interchangeable lens 3, whereas in the embodiment of FIG. 4, the camera body 1 receives the lens discrimination signal of the interchangeable lens 3 and outputs this discrimination signal to the intermediate barrel 2, whereby the ROM corresponding to the interchangeable lens 3 is automatically selected.

Figure 6:
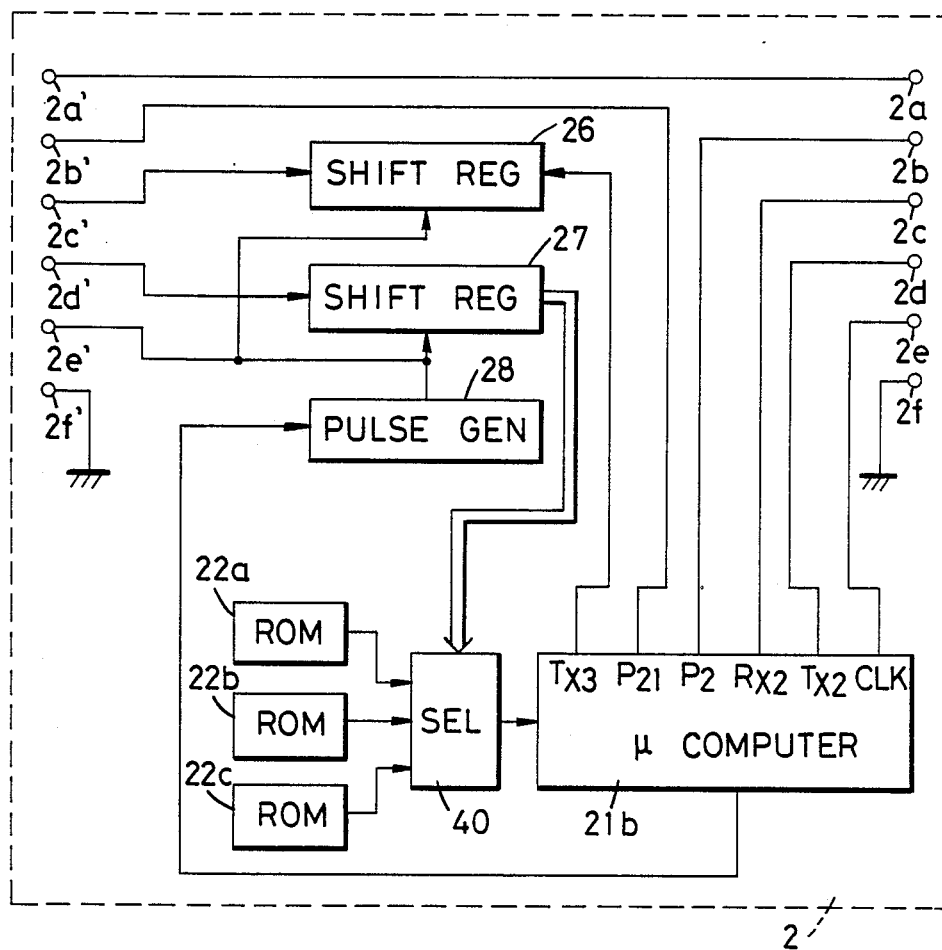
FIG. 6 is a circuit diagram of a third embodiment of the present invention.
Figure 7:
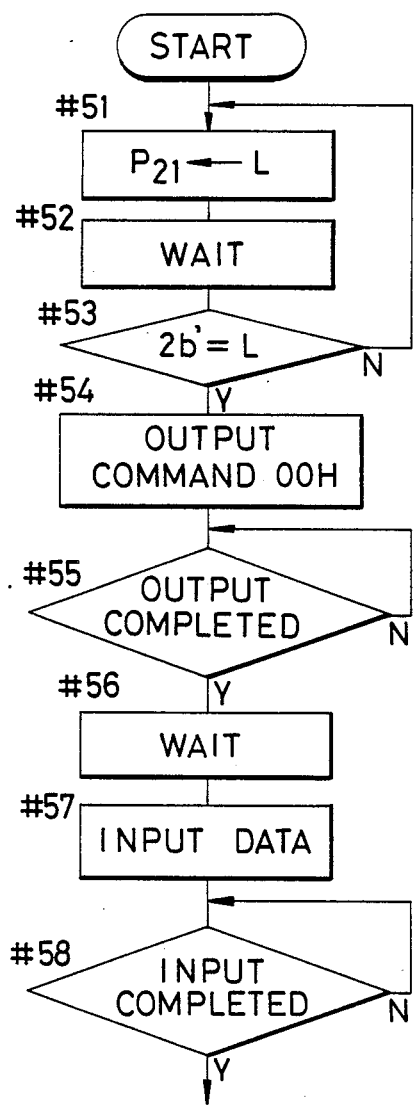
FIG. 7 is a flow chart of the third embodiment.

A third embodiment of the present invention is shown in FIG. 6, and a flow chart thereof is shown in FIG. 7. The difference of this embodiment from the second embodiment is that the command data is output to the interchangeable lens 3 through a shift register 26 and the data of the interchangeable lens 3 can be input to a shift register 27. Also, when viewed from the camera body side, the operation of this embodiment is entirely similar to that of the first embodiment. In FIG. 6, the MCU 11a is omitted, it being understood that there is the same MCU 11a as that of FIG. 4. The optical system 20 is also omitted.

The MCU 21b of the intermediate barrel 2 renders the port $P_{21}$ into "L" (#51). At this time, the lens side MCU 31 confirms that the contact 3b becomes "L", and becomes ready to wait for a command. The MCU 21b confirms that the contact 2b' is "L" (#53), whereafter it sets a command 00H from $T_{x3}$ into the shift register 26, causes a pulse generator 28 to output a clock pulse, and causes the content of the shift register 26 to be output to the interchangeable lens side (#54). When the command input is completed, the MCU 31 of the interchangeable lens 3 is set to a state in which it is capable of outputting the lens discrimination signal, because the substance of the command is 00H. After the command output is completed (#55), the MCU 21b causes the pulse generator 28 to output a clock pulse in a predetermined time, and causes the lens discrimination signal from the interchangeable lens 3 to be input to the shift register 27 (#57). When the lens discrimination signal has been completely set in the shift register 27 (#58), the selector 40 selects the ROM corresponding to the interchangeable lens in accordance with the content of the shift register 27, as in the second embodiment, whereafter an operation similar to that of the first embodiment takes place. The third embodiment differs from the second embodiment in that the intermediate barrel automatically selects the ROM corresponding to the interchangeable lens.

We claim:
1. A camera system including:
   (a) a camera body on which each of a plurality of interchangeable lenses is mountable; and
   (b) an intermediate barrel mountable between said camera body and each of said plurality of interchangeable lenses, said intermediate barrel having memory means in which data are fixedly stored, selector means for selecting a part of said data, and output means for outputting the selected part of said data to said camera body, said data indicating a plurality of combined aberration information with respect to a plurality of combined optical systems which consist of an optical system of said intermediate barrel and respective optical systems of said plurality of interchangeable lenses, said camera body having calculating means for effecting a calculation process on the basis of said selected part of said data.

2. A camera system according to claim 1, wherein said data includes combined spherical aberration information with respect to said combined optical systems.

3. A camera system according to claim 2, wherein said calculating means effects said calculation process with respect to exposure to auto-focus.

4. A camera system including:
   (a) a camera body;
   (b) a plurality of interchangeable lenses, each of which is mountable on said camera body; and
   (c) an intermediate barrel mountable between said camera body and each of said plurality of interchangeable lenses, said intermediate barrel having memory means in which data are fixedly stored, an operating member, selector means responsive to said operating member for selecting a part of said data, and output means for outputting the selected part of said data to said camera body, said data indicating a plurality of combined aberration information with respect to combined optical systems which consist of an optical system of said intermediate barrel and respective optical systems of said plurality of interchangeable lenses, said camera body having calculating means for effecting a calculation process with respect to exposure or auto-focus on the basis of said selected part of said data.

5. A camera system according to claim 4, wherein said data includes combined spherical aberration information with respect to said combined optical systems.

6. A camera system including:
   (a) a camera body;
   (b) a plurality of interchangeable lenses, each of which is mountable on said camera body and has means for generating a discriminating signal; and
   (c) an intermediate barrel mountable between said camera body and each of said plurality of interchangeable lenses, said intermediate barrel having memory means in which data are fixedly stored, transfer means for transferring said discriminating signal from each of said interchangeable lenses to said camera body, selector means for selecting a part of said data, and output means for outputting the selected part of said data to said camera body, said data indicating a plurality of combined aberration information with respect to combined optical systems which consist of an optical system of said intermediate barrel and respective optical systems of said plurality of interchangeable lenses, said camera body having calculating means for effecting a calculation process on the basis of said selected part of said data;
   (d) said camera body having means for producing a command signal in response to said discriminating signal transferred by said transfer means, said selector means selecting said part of said data in response to said command signal.

7. A camera system according to claim 6, wherein said data includes combined spherical aberration information with respect to said combined optical systems.

8. A camera system according to claim 7, wherein said calculating means effects said calculation process with respect to exposure or auto-focus.

9. A camera system including:
   (a) a camera body;

(b) a plurality of interchangeable lenses, each of which is mountable on said camera body; and (c) an intermediate barrel mountable between said camera body and each of said interchangeable lenses, said intermediate barrel having memory means in which data are fixedly stored, command means for generating a command signal, selector means for selecting a part of said data, and output means for outputting the selected part of said data to said camera body, said data indicating a plurality of combined aberration information with respect to combined optical systems which consist of an optical system of said intermediate barrel and respective optical systems of said plurality of interchangeable lenses, said camera body having calculating means for effecting a calculation process on the basis of said selected part of said data;

(d) each of said plurality of interchangeable lenses having means for outputting a discriminating signal in response to said command signal, said selector means selecting said selected part of said data in response to said discriminating signal.

10. A camera system according to claim 9, wherein said data includes combined spherical aberration information with respect to said combined optical systems.

11. A camera system according to claim 10, wherein said calculating means effects said calculation process with respect to exposure or auto-focus.

12. An intermediate barrel mountable between a camera body and each of a plurality of interchangeable lenses, comprising:

(a) memory means in which data are fixedly stored;

(b) selector means for selecting a part of said data; and (c) output means for outputting the selected part of said data to said camera body, said data indicating a plurality of combined aberration information with respect to combined optical systems which consist of an optical system of said intermediate barrel and respective optical systems of said plurality of interchangeable lenses;

(d) said camera body effecting a calculation process on the basis of said selected part of said data.

* * * * *